(12) United States Patent
Ishii et al.

(10) Patent No.: US 11,221,201 B2
(45) Date of Patent: Jan. 11, 2022

(54) PROFILE MEASURING MACHINE AND PROFILE MEASURING METHOD

(71) Applicant: MITUTOYO CORPORATION, Kawasaki (JP)

(72) Inventors: Kazunari Ishii, Yamato (JP); Fumihiro Takemura, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 36 days.

(21) Appl. No.: 16/934,500

(22) Filed: Jul. 21, 2020

(65) Prior Publication Data

US 2021/0033377 A1  Feb. 4, 2021

(30) Foreign Application Priority Data

Jul. 29, 2019 (JP) .............................. JP2019-138910

(51) Int. Cl.
*G01B 5/008* (2006.01)
*G01B 5/20* (2006.01)

(52) U.S. Cl.
CPC ............. *G01B 5/008* (2013.01); *G01B 5/202* (2013.01)

(58) Field of Classification Search
None
See application file for complete search history.

(56) References Cited

U.S. PATENT DOCUMENTS

| 4,166,323 | A | * | 9/1979 | Maag | G01B 7/283 |
| | | | | | 33/501.9 |
| 5,461,797 | A | * | 10/1995 | Royer | G01B 5/202 |
| | | | | | 33/501.14 |
| 7,392,692 | B2 | * | 7/2008 | Noda | G01B 5/008 |
| | | | | | 33/503 |

(Continued)

OTHER PUBLICATIONS

Taguchi, "The Newest Gear Measuring Machine and Measurement Technology", Mechanical Engineering, Aug. 2016, pp. 56-57, includes English translation, (Cited in Specification) 5 pages.

*Primary Examiner* — Christopher W Fulton
(74) *Attorney, Agent, or Firm* — Rankin, Hill & Clark LLP

(57) ABSTRACT

A profile measuring machine is for measuring a profile of a workpiece having a plurality of known-profile portions and a plurality of unknown-profile portions, the known-profile portions being cyclically arranged via the respective unknown-profile portions. The profile measuring machine includes: a scanning probe having a contact piece capable of being in contact with the workpiece; a drive mechanism for moving the scanning probe; an autonomous scanning measurement unit for controlling the drive mechanism to perform the autonomous scanning measurement; a measurement-path calculator for calculating a movement path of the scanning probe; and a nominal-value scanning measurement unit for controlling the drive mechanism to move the scanning probe along the movement path to perform a nominal-value scanning measurement. The measurement-path calculator calculates the movement path for the workpiece based (Continued)

on measurement results of the unknown-profile portions measured by the autonomous scanning measurement unit and design data of the known-profile portions.

8 Claims, 5 Drawing Sheets

(56) References Cited

U.S. PATENT DOCUMENTS

| | | | | |
|---|---|---|---|---|
| 7,886,453 | B2* | 2/2011 | Ould | G01B 21/042 |
| | | | | 33/503 |
| 7,958,564 | B2* | 6/2011 | Noda | G01B 5/008 |
| | | | | 850/21 |
| 8,229,694 | B2* | 7/2012 | Nakagawa | G01B 21/045 |
| | | | | 702/95 |
| 8,332,173 | B2* | 12/2012 | Ishikawa | G01B 21/045 |
| | | | | 702/95 |
| 8,991,246 | B2* | 3/2015 | Hirono | G01B 5/202 |
| | | | | 73/162 |
| 9,752,860 | B2* | 9/2017 | Marsh | G01B 5/202 |
| 9,915,516 | B2* | 3/2018 | Noda | G05B 19/401 |
| 10,274,297 | B2* | 4/2019 | Noda | G01B 5/008 |
| 11,092,430 | B2* | 8/2021 | Wagaj | G01B 5/008 |
| 2005/0111725 | A1* | 5/2005 | Noda | G01B 5/20 |
| | | | | 382/141 |

* cited by examiner

PROFILE MEASURING MACHINE AND PROFILE MEASURING METHOD

The entire disclosure of Japanese Patent Application No. 2019-138910 filed Jul. 29, 2019 is expressly incorporated by reference herein.

TECHNICAL FIELD

The present invention relates to a profile measuring machine and a profile measuring method for measuring a workpiece having cyclically arranged structures of the same profile.

BACKGROUND ART

Some of typically known measuring machines are configured to measure a workpiece (e.g. a gear) having a plurality structures of the same profile (e.g. teeth of the gear) (see, for instance, Literature 1: "The newest gear measuring machine and measurement technology" by Tetsuya Taguchi of Osaka Seimitsu Kikai Co., Ltd., Mechanical Engineering, August 2016, pp. 56-57).

Literature 1 relates to a measuring machine for measuring a gear profile. Gears are usually produced using a machine tool attached with a gear cutting tool. The blade shape is different in each of gear cutting tools. The profile of the tooth root portion of the teeth of the gear is different in each of the gears depending on the blade shape of the gear cutting tools and machining process of the gears. Accordingly, the specification of the tooth root portion of the gear is usually not described in drawings of gears.

In view of the above, the measuring machine disclosed in Literature 1 conducts two probing measurement procedures to the tooth root portion of an unknown profile using a uniaxial probe. Then, an approximate profile of the gear is calculated based on the measurement results to derive a measurement path for a scanning measurement. Subsequently, the probe of the measuring machine is exchanged to a scanning probe to measure the profile of the gear through the scanning measurement.

However, the typical measuring machine as disclosed in Literature 1 requires two probing measurement procedures and exchange of the uniaxial probe to the scanning probe. Accordingly, the time required for the measurement process disadvantageously increases.

Meanwhile, an autonomous scanning measurement, in which the scanning measurement is conducted while a contact piece of the probe is brought into contact with the workpiece of an unknown profile at a constant push amount, may be applicable. In this case, it is not necessary to exchange the probe. However, the autonomous scanning measurement, in which the probe necessarily measures the profile of the workpiece while the push amount against the workpiece of the unknown profile is kept constant, requires that a measurement speed has to be reduced in order to keep the probe from being separated from or excessively pushed against the workpiece. Accordingly, the autonomous scanning measurement also entails increase in the time required for the measurement process.

SUMMARY OF THE INVENTION

In view of the above, an object of the invention is to provide a profile measuring machine and a profile measuring method capable of quickly conducting a profile measurement on a workpiece partially having an unknown profile.

A profile measuring machine according to a first aspect of the invention is configured to measure a profile of a workpiece including a plurality of known-profile portions whose profiles are known, the known-profile portions being cyclically arranged via respective unknown-profile portions whose profiles are unknown, the profile measuring machine including: a scanning probe including a contact piece configured to be in contact with the workpiece; a drive mechanism configured to move the scanning probe; an autonomous scanning measurement unit configured to control the drive mechanism to perform an autonomous scanning measurement, in which the scanning probe is moved along the workpiece to measure the profile of the workpiece while the scanning probe is pressed against the workpiece by a predetermined push amount; a measurement-path calculator configured to calculate a movement path of the scanning probe for performing a scanning measurement on the workpiece; and a nominal-value scanning measurement unit configured to control the drive mechanism to perform a nominal-value scanning measurement, in which the scanning probe is moved along the movement path to measure the profile of the workpiece, in which the measurement-path calculator is configured to calculate the movement path for the workpiece based on measurement results of at least one of the unknown-profile portions measured by the autonomous scanning measurement unit and design data of the known-profile portions.

In the profile measuring machine according to the above aspect of the invention, the autonomous scanning measurement by the autonomous scanning measurement unit is performed on the unknown-profile portions. The measurement-path calculator is configured to calculate the movement path based on the measurement results of the unknown-profile portions measured by the autonomous scanning measurement unit and the design data of the known-profile portions. Accordingly, the nominal-value scanning measurement unit can perform the nominal-value scanning measurement on the entirety of the workpiece even when the workpiece includes the unknown-profile portions. At this time, it is not necessary to perform the probing measurement using a uniaxial probe on the unknown-profile portions as in typical measuring machines, eliminating the need for exchanging the probes. Accordingly, the workpiece can be rapidly measured. Further, when the entirety of the workpiece is measured by the autonomous scanning measurement, the measurement speed is limited. In contrast, in the above aspect of the invention, it is only necessary to perform the autonomous scanning measurement only on a part of the unknown-profile portions, and the rest of the portions are measured by the nominal-value scanning measurement. Accordingly, the time required for the measurement can be reduced as compared with the instance in which the entirety of the workpiece is measured by the autonomous scanning measurement.

In the profile measuring machine according to the above aspect, it is preferable that the autonomous scanning measurement unit is configured to perform the autonomous scanning measurement on one of the unknown-profile portions, and the measurement-path calculator is configured to calculate the movement path based on the measurement results of the one of the unknown-profile portions and the design data of the known-profile portions.

In the above arrangement, it is only necessary to perform the autonomous scanning measurement on only one of the plurality of unknown-profile portions. Thus, the time required for the autonomous scanning measurement and, consequently, the time required for the profile measurement of the entirety of the workpiece can be reduced.

A profile measuring machine according to a second aspect of the invention is configured to measure a profile of a workpiece including a plurality of known-profile portions whose profiles are known, the known-profile portions being cyclically arranged via respective unknown-profile portions whose profiles are unknown, the profile measuring machine including: a scanning probe including a contact piece configured to be in contact with the workpiece; a drive mechanism configured to move the scanning probe; an autonomous scanning measurement unit configured to control the drive mechanism to perform an autonomous scanning measurement, in which the scanning probe is moved along the workpiece to measure the profile of the workpiece while the scanning probe is pressed against the workpiece by a predetermined push amount; a measurement-path calculator configured to calculate a movement path of the scanning probe when a scanning measurement is performed on the workpiece; and a nominal-value scanning measurement unit configured to control the drive mechanism to perform a nominal-value scanning measurement, in which the scanning probe is moved along the movement path to measure the profile of the workpiece, in which the measurement-path calculator is configured to calculate the movement path for the workpiece based on measurement results of a combination of at least one of the known-profile portions and at least one of the unknown-profile portions measured by the autonomous scanning measurement unit.

In the profile measuring machine according to the above aspect of the invention, the autonomous scanning measurement by the autonomous scanning measurement unit is performed on a part of the unknown-profile portions and the known-profile portions. The measurement-path calculator is configured to calculate the movement path based on the measurement results of the unknown-profile portion(s) and the known-profile portion(s) measured by the autonomous scanning measurement unit. Accordingly, in the same manner as the above first aspect, the nominal-value scanning measurement unit in the second aspect of the invention can perform the nominal-value scanning measurement on the entirety of the workpiece including the unknown-profile portions. Accordingly, the time required for the measurement can be reduced. Further, the movement path can be calculated in the second aspect of the invention even when the design data for the known-profile portions is not available.

In the profile measuring machine according to the above aspect, it is preferable that the autonomous scanning measurement unit is configured to perform the autonomous scanning measurement on a pair of one of the unknown-profile portions and one of the known-profile portions, and the measurement-path calculator is configured to calculate the movement path based on the measurement results of the pair of one of the unknown-profile portions and one of the known-profile portions.

In the above arrangement, it is only necessary to perform the autonomous scanning measurement on only one of the combinations of the plurality of unknown-profile portions and known-profile portions. Thus, the time required for the autonomous scanning measurement and, consequently, the time required for the profile measurement of the entirety of the workpiece can be reduced.

In the profile measuring machine according to the above first and second aspect, it is preferable that the nominal-value scanning measurement unit is configured to output a measurement error signal when the push amount of the scanning probe is out of a predetermined tolerable range in the measurement along the movement path, and the autonomous scanning measurement unit is configured to perform the autonomous scanning measurement again when the measurement error signal is outputted.

In the above arrangement, the measurement error signal is outputted when a measurement error occurs during the nominal-value scanning measurement, whereat the autonomous scanning measurement by the autonomous scanning measurement unit is performed again. In the profile measuring machine of the first aspect, for instance, when the measurement error occurs during the nominal-value scanning measurement, the autonomous scanning measurement is performed again on a part of the unknown-profile portions. In the profile measuring machine of the second aspect, when the measurement error signal is outputted during the nominal-value scanning measurement, the autonomous scanning measurement is performed again on a part of the unknown-profile portions and the known-profile portions. Thus, the movement path is calculated again by the measurement-path calculator. Accordingly, the nominal-value scanning measurement unit is only required to perform the nominal-value scanning measurement in accordance with the re-calculated movement path. Thus, a rapid measurement, which is not interrupted by the measurement error signal, can be performed by the autonomous scanning measurement and the nominal-value scanning measurement while keeping the measurement accuracy.

A profile measuring method according to a third aspect of the invention is configured to measure a profile of a workpiece using a profile measuring machine including: a scanning probe including a contact piece configured to be in contact with the workpiece; and a drive mechanism configured to move the scanning probe, the workpiece including a plurality of known-profile portions whose profiles are known, the known-profile portions being cyclically arranged via respective unknown-profile portions whose profiles are unknown, the profile measuring method including: an autonomous scanning measurement step of controlling the drive mechanism to perform an autonomous scanning measurement, in which the profile of the workpiece is measured by moving the scanning probe along the workpiece while the scanning probe is pressed against the workpiece by a predetermined push amount; a movement-path calculation step, in which a movement path of the scanning probe when a scanning measurement is performed on the workpiece is calculated; and a nominal-value scanning measurement step of controlling the drive mechanism to perform a nominal-value scanning measurement, in which the scanning probe is moved along the movement path to measure the profile of the workpiece, in which in the measurement-path calculating step, the movement path for the workpiece is calculated based on measurement results of at least one of the unknown-profile portions measured in the autonomous scanning measurement step and design data of the known-profile portions.

In the above aspect of the invention, in the same manner as the first aspect, the autonomous scanning measurement is performed only on a part of the unknown-profile portions, and the movement path for performing the nominal-value scanning measurement is calculated based on the measurement results of the autonomous scanning measurement. Accordingly, in the same manner as the first aspect of the invention, the time required for the measurement can be significantly reduced as compared with the instance in which the entirety of the workpiece is measured by the autonomous scanning measurement.

A profile measuring method according to a fourth aspect of the invention is configured to measure a profile of a workpiece using a profile measuring machine including: a scanning probe including a contact piece configured to be in contact with the workpiece; and a drive mechanism configured to move the scanning probe, the workpiece including a plurality of known-profile portions whose profiles are known, the known-profile portions being cyclically arranged via respective unknown-profile portions whose profiles are unknown, the profile measuring method including: an autonomous scanning measurement step of controlling the drive mechanism to perform an autonomous scanning measurement, in which the profile of the workpiece is measured by moving the scanning probe along the workpiece while the scanning probe is pressed against the workpiece by a predetermined push amount; a movement-path calculation step, in which a movement path of the scanning probe when a scanning measurement is performed on the workpiece is calculated; and a nominal-value scanning measurement step of controlling the drive mechanism to perform a nominal-value scanning measurement, in which the scanning probe is moved along the movement path to measure the profile of the workpiece, in which, in the measurement-path calculation step, the movement path for the workpiece is calculated based on measurement results of a combination of one of the known-profile portions and one of the unknown-profile portions measured in the autonomous scanning measurement step.

In the above aspect of the invention, in the same manner as the second aspect, the autonomous scanning measurement is performed only on a part of the combinations of the unknown-profile portions and the known-profile portions, and the measurement path for performing the nominal-value scanning measurement is calculated based on the measurement results of the autonomous scanning measurement. Accordingly, in the same manner as the second aspect of the invention, the time required for the measurement can be significantly reduced as compared with the instance in which the entirety of the workpiece is measured by the autonomous scanning measurement. Further, an accurate profile measurement can be performed on a workpiece including unknown-profile portions and known-profile portions even in the absence of any design data.

According to the above aspects of the invention, it is not necessary to perform the probing measurement using a uniaxial probe on the unknown-profile portions as in typical measuring machines, eliminating the need for exchanging the probes. Accordingly, the work can be rapidly measured. Further, though the measurement speed is limited when the entirety of the workpiece is measured by the autonomous scanning measurement, the above aspects of the invention, in which the autonomous scanning measurement is required only on a part of the unknown-profile portions and the rest of the portions are measured by the nominal-value scanning measurement, can considerably reduce the time required for the measurement as compared with an instance in which the autonomous scanning measurement is performed on the entirety of the workpiece.

DESCRIPTION OF EMBODIMENT(S)

First Exemplary Embodiment

A first exemplary embodiment of the invention will be described below.

Figure 1:
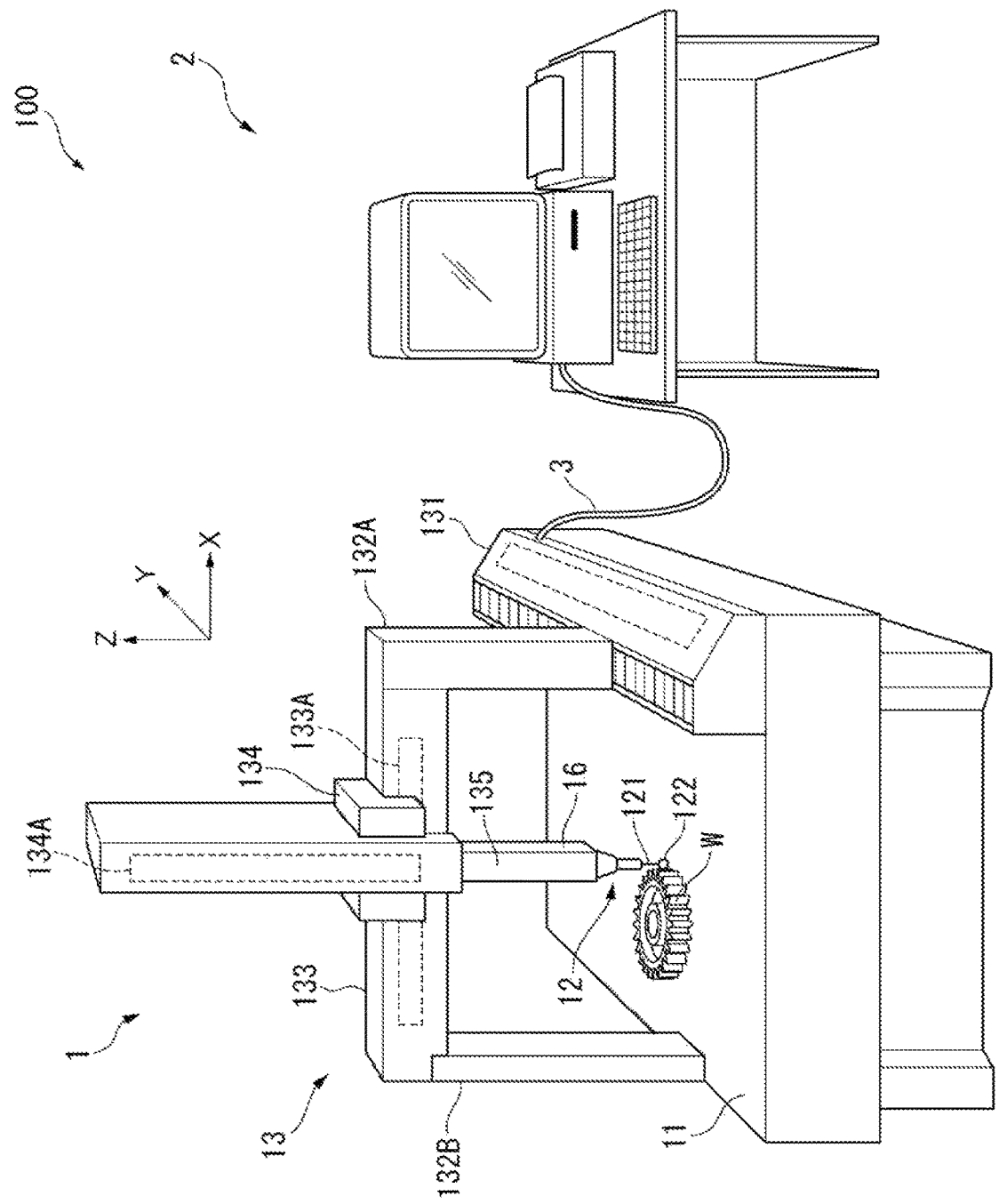
FIG. 1 is a perspective view showing an overall structure of a profile measuring machine according to a first exemplary embodiment.
Figure 2:
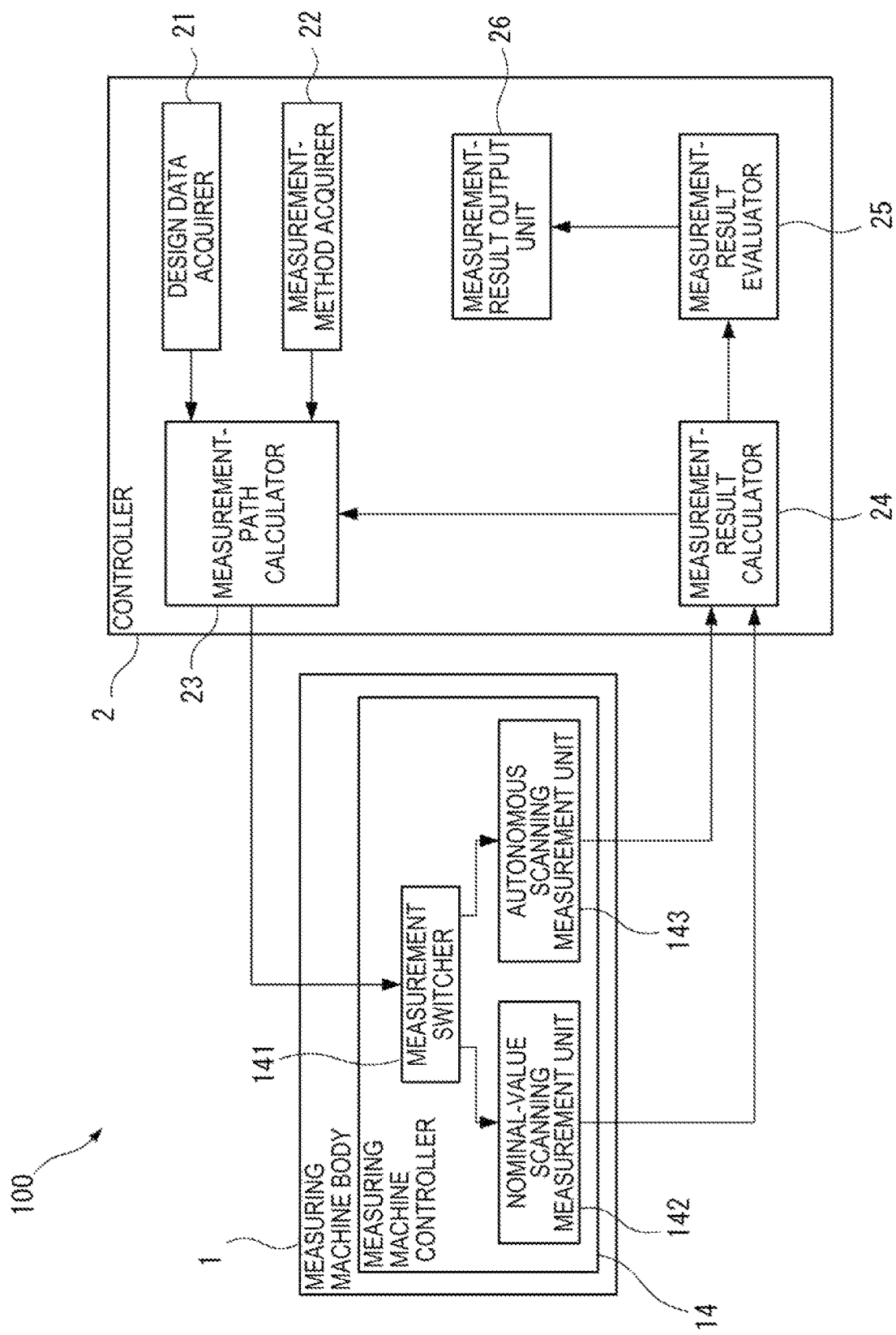
FIG. 2 is a block diagram showing a functional arrangement of the profile measuring machine according to the first exemplary embodiment.

FIG. 1 is a perspective view showing an overall structure of a profile measuring machine 100 according to the first exemplary embodiment. FIG. 2 is a block diagram showing a functional arrangement of the profile measuring machine 100 according to the first exemplary embodiment.

As shown in FIG. 1, the profile measuring machine 100 includes a measuring machine body 1 and a controller 2. The measuring machine body 1 and the controller 2 are connected through, for instance, a cable 3. It should be noted that an additional device (e.g. a motion controller) may be interposed between the measuring machine body 1 and the controller 2. Further, the measuring machine body 1 and the controller 2 may be communicably connected by wireless or the like instead of the cable 3.

Structure of Measuring Machine Body 1

The measuring machine body 1 includes, as shown in FIG. 1 for instance, a stage 11, a scanning probe 12, and a drive mechanism 13 holding the scanning probe 12 in a movable manner.

Specifically, the stage 11, which is a table disposed via an anti-vibration base or the like, includes a horizontal surface (defining an XY plane) configured to receive a workpiece W.

A Y-drive mechanism 131, which is a part of the drive mechanism 13, is provided on an end of the stage 11 (for instance, +X end in the example shown in FIG. 1).

The drive mechanism 13 includes, for instance, a Y-drive mechanism 131, a first beam support 132A, a second beam support 132B, a beam 133, an X-slider 134, and a Z-slider 135 as shown in FIG. 1.

The Y-drive mechanism 131 holds the first beam support 132A and moves the first beam support 132A along a Y-direction. The Y-drive mechanism 131 includes a drive source (not shown), a drive transmission driven by a drive force of the driving source to move the first beam support 132A in the Y-direction, and a Y-scale configured to detect a displacement in the Y-direction.

The first beam support 132A, which is vertically provided on the Y-drive mechanism 131, is movable in the Y-direction by the Y-drive mechanism 131.

The second beam support 132B is parallel to the first beam support 132A. An air bearing is interposed between the second beam support 132B and the stage 11, so that the second beam support 132B is movable in the Y-direction with respect to the stage 11 without being affected by friction resistance.

The beam 133, which spans an area between the first beam support 132A and the second beam support 132B, is a beam member parallel to the X-direction. The beam 133 is provided with the X-slider 134 and an X-drive mechanism 133A.

The X-drive mechanism 133A includes, for instance, a drive source (not shown), a drive transmission driven by a drive force of the driving source to move the X-slider 134 in the X-direction, and an X-scale configured to detect a displacement in the X-direction.

The X-slider 134 includes a Z-drive mechanism 134A that holds the Z-slider 135 in a manner movable in a Z-direction and drives the Z-slider 135 in the Z-direction. The Z-drive mechanism 134A includes, for instance, a drive source (not shown), a drive transmission driven by a drive force of the driving source to move the Z-slider 135 in the Z-direction, and a Z-scale configured to detect a displacement in the Z-direction.

The scanning probe 12 is fixed at an end of the Z-slider 135.

The scanning probe 12 includes a probe body (not shown) attached to the Z-slider 135, and a stylus 121 detachably attached to the probe body. A tip ball 122 (contact piece) in a form of, for instance, a sphere is provided at an end of the stylus 121. A displacement detector configured to detect a push amount of the tip ball 122 in the X, Y and Z-directions is provided in the probe body.

In the measuring machine body 1, when the tip ball 122 is brought into contact with the workpiece W placed on the stage 11 to push the tip ball 122 from a reference position (rest position) by a predetermined push amount, the displacement detector detects the push amount in the X, Y, and Z-directions (i.e. XYZ coordinates of the tip ball 122 (displacement from the reference position)) and outputs the detected coordinates to the controller 2.

The scales provided to the Y-drive mechanism 131, X-drive mechanism 133A, and Z-drive mechanism 134A of the measuring machine body 1 are respectively configured to detect the displacements in the X, Y and Z directions by the drive mechanism 13 and output the displacements to the controller 2.

The measuring machine body 1 according to the first exemplary embodiment includes a measuring machine controller 14 as shown in FIG. 2. The measuring machine controller 14, which is embodied as a microcomputer and the like, is configured to control an operation of the measuring machine body 1.

Specifically, the measuring machine controller 14 serves as a measurement switcher 141, a nominal-value scanning measurement unit 142 and an autonomous scanning measurement unit 143 as shown in FIG. 2.

The measurement switcher 141 is configured to switch the operation of the measuring machine body 1 in response to a control command from the controller 2. Specifically, the measurement switcher 141 is configured to control on/off of an autonomous scanning flag.

The nominal-value scanning measurement unit 142 is configured to perform a nominal-value scanning measurement on the workpiece W when the autonomous scanning flag has been set off by the measurement switcher 141. The nominal-value scanning measurement unit 142 is configured to receive the measurement path from the controller 2 and perform the nominal-value scanning measurement on the workpiece W by moving the scanning probe 12 in accordance with the received measurement path.

Further, the nominal-value scanning measurement unit 142 is configured to output a measurement error signal when the push amount of the tip ball 122 of the scanning probe 12 is out of a predetermined tolerable range while performing the nominal-value scanning measurement. Specifically, the measurement error signal is outputted when the displacement detector detects the push amount exceeding a predetermined upper limit or no push amount due to separation of the tip ball 122 from the workpiece W.

The measurement switcher 141 is configured to switch on the autonomous scanning flag when the measurement error signal is outputted.

The autonomous scanning measurement unit 143 is configured to perform an autonomous scanning measurement on the workpiece W when the autonomous scanning flag has been set on by the measurement switcher 141. The autonomous scanning measurement unit 143 is configured to perform an autonomous scanning measurement, in which the tip ball 122 is pressed against the workpiece W so that the push amount of the scanning probe 12 reaches a predetermined constant value and the measurement is made while keeping the push amount of the scanning probe 12 at the predetermined constant value. In the autonomous scanning measurement, the measurement path based on a design data is not required. However, in order to keep the push amount at the constant value, a movement speed of the scanning probe 12 is significantly restricted.

Arrangement of Controller 2

The controller 2, which is provided by, for instance, a computer (e.g. a personal computer), is configured to output a measurement command to the measuring machine body 1 and evaluate measurement results on the workpiece W received from the measuring machine body 1.

Specifically, the controller 2 includes a storage provided by a memory and the like and an arithmetic unit provided by a CPU (Central Processing Unit) and the like. Then, the arithmetic unit, which reads and runs a software program stored in the storage, serves as a design data acquirer 21, a measurement-method acquirer 22, a measurement-path calculator 23, a measurement-result calculator 24, a measurement-result evaluator 25, a measurement-result output unit 26 and the like, as shown in FIG. 2.

The design data acquirer 21 is configured to acquire the design data of the workpiece W inputted by a user. The design data may be acquired from a storage medium (e.g. an optical storage medium) or through a communication line (e.g. the Internet).

The measurement-method acquirer 22 is configured to acquire the measurement method set by the user. In the first exemplary embodiment, when the workpiece W is an object having a predetermined profile (e.g. a gear), a composite measurement, which is a combination of the autonomous scanning measurement and the nominal-value scanning measurement, is performed. The details of the profile measuring method will be described later. Meanwhile, the measurement method may alternatively be designated by the user in the first exemplary embodiment. In this case, the measurement-method acquirer 22 acquires the measurement method based on an input operation by the user. Accordingly, a profile of a gear can be measured only by the nominal-value scanning measurement or only by the autonomous scanning measurement.

The measurement-path calculator 23 is configured to calculate a movement path (measurement path) of the scanning probe 12 when the nominal-value scanning measurement is performed. For instance, when the profile measurement of the workpiece W is performed only by the nominal-value scanning measurement, the measurement-path calculator 23 calculates the measurement path based on the design data of the workpiece W acquired by the design data acquirer 21. Alternatively, when the workpiece W is an object (e.g. a gear) having a predetermined profile and the profile measurement is performed using both of the autonomous scanning measurement and the nominal-value scanning measurement, the measurement-path calculator 23 calculates the measurement path using, in addition to the design data, the measurement results acquired through the autonomous scanning measurement.

The measurement-result calculator 24 is configured to determine the profile of the workpiece W based on the measurement data received from the measuring machine body 1 (i.e. the displacements of the scanning probe 12 in X, Y and Z directions respectively measured by the Y scale, X scale and Z scale, and the push amount of the tip ball 122 in the X, Y and Z directions detected by the displacement detector.

The measurement-result evaluator 25 is configured to evaluate the measurement results determined by the measurement-result calculator 24. Specifically, the measurement-result evaluator 25 is configured to judge whether the measurement data is abnormal.

The measurement-result output unit 26 is configured to output the measurement results based on the results of the evaluation by the measurement-result evaluator 25. For instance, the measurement-result output unit 26 displays measurement results on a monitor device connected to the controller 2 and/or prints the measurement results with a printer connected to the controller 2.

Profile Measuring Method

Next, a profile measuring method with use of the profile measuring machine 100 will be described below.

The profile measuring machine 100 according to the first exemplary embodiment, which is configured to measure profiles of a variety of objects as the workpiece W, is especially suitably applicable for the profile measurement of the workpiece W (e.g. a gear) having a known-profile portion whose profile is known and an unknown-profile portion whose profile is unknown. A profile measuring method for the workpiece W having the above-described known-profile portion and unknown-profile portion, which more specifically is a gear, will be described hereinbelow.

The gear as an example of the workpiece W will be described.

Figure 3:
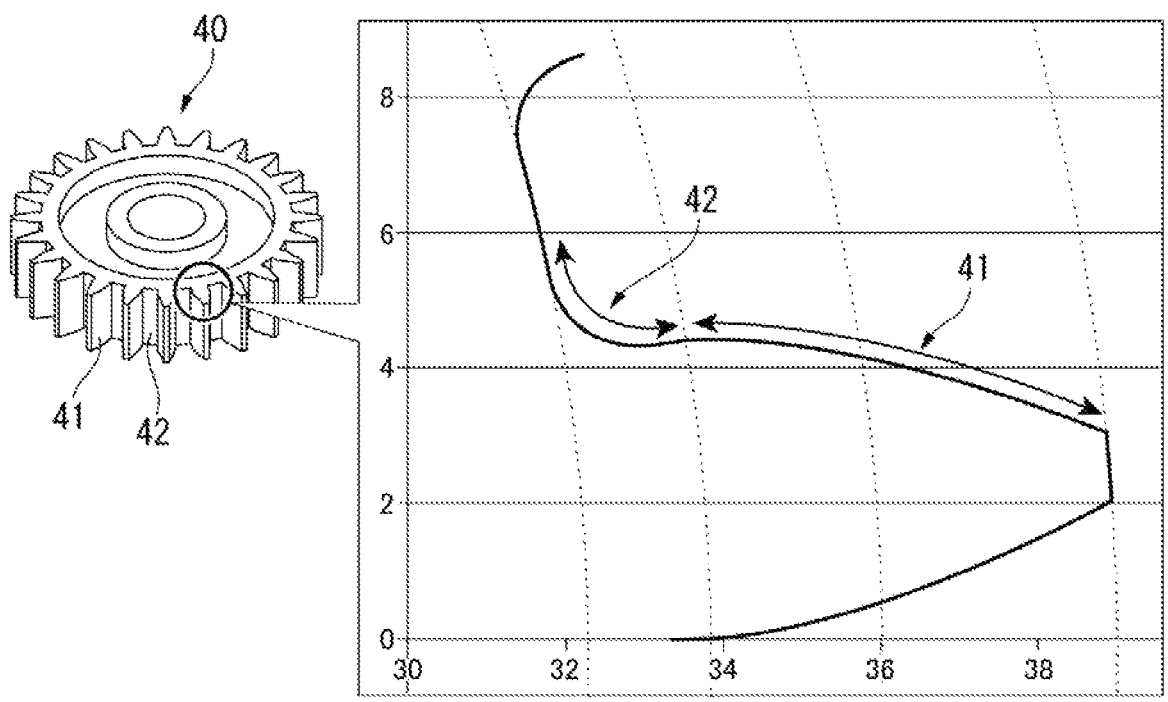
FIG. 3 illustrates an outline of a gear, which is an example of a workpiece according to the first exemplary embodiment.

FIG. 3 illustrates an outline of a gear 40, which is an example of the workpiece W according to the first exemplary embodiment.

As shown in FIG. 3, the gear 40 includes a plurality of tooth profile portions 41, and a plurality of tooth root portions 42. The tooth profile portions 41 are cyclically arranged at constant intervals. The tooth root portions 42 are each disposed between adjacent ones of the tooth profile portions 41. The gear 40 is usually manufactured using a gear cutting tool.

The tooth profile portions 41, which are portions to be meshed with a meshing target object for the gear 40, are highly accurately formed based on the predetermined design data by the gear cutting tool. In other words, the tooth profile portions 41 are the known-profile portions whose profiles are known.

In contrast, the tooth root portions 42, which have minutely different profiles depending on a machining process of the gear and/or the shape of the blade of the gear cutting tool, do not have profiles in accordance with the design data. In other words, the tooth root portions 42 are the unknown-profile portions whose profiles are unknown.

Typically, much weight has not been put on the profile of the tooth root portions 42 in the profile measurement of the gear 40 using a coordinate measuring machine. However, recent studies have shown that the profiles of the tooth root portions 42 are an important factor for analyzing the strength of the gear 40. Accordingly, an accurate profile measurement of the tooth root portions 42, in addition to the tooth profile portions 41, has been regarded important.

However, typical coordinate measuring machines can select only one of the autonomous scanning measurement and the nominal-value scanning measurement. When the gear 40 is measured through the nominal-value scanning measurement, since the profiles of the tooth root portions 42 are unknown as described above, the probe path cannot be correctly determined. In other words, the tip ball 122 may be excessively pressed against or separated from the gear 40 depending on the probe path. In such a case, the measurement is interrupted. Further, the autonomous scanning measurement, in which the portion of the unknown profile can be highly accurately measured, requires that the scanning probe 12 should be moved while keeping the push amount within a predetermined range. Accordingly, the movement speed of the scanning probe 12 is reduced, resulting in longer time for the measurement.

In contrast, the profile measuring machine 100 according to the first exemplary embodiment is configured to measure the profile of the workpiece W (e.g. the gear 40) having cyclically arranged known-profile portions and unknown-profile portions, in which the movement path of the scanning probe 12 in measuring the gear 40 by the nominal-value scanning measurement is calculated based on the results of the autonomous scanning measurement of the unknown-profile portions and the design data of the known-profile portions. A specific measurement process will be described below.

Figure 4:
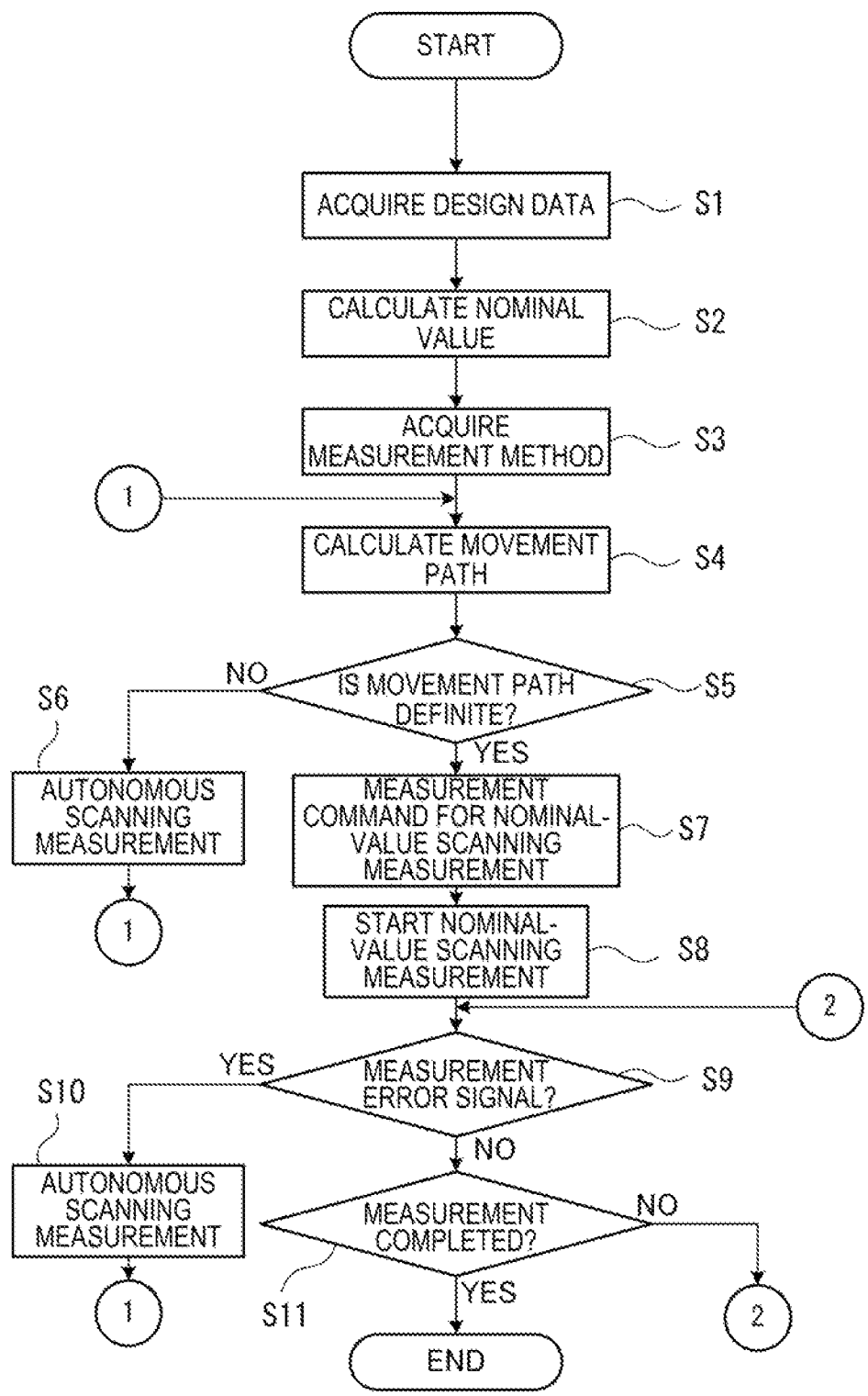
FIG. 4 is a flow chart showing a profile measuring method according to the first exemplary embodiment.

FIG. 4 is a flow chart showing the profile measuring method according to the first exemplary embodiment.

Initially, the design data acquirer 21 of the controller 2 acquires the design data of the workpiece W (the gear 40) (Step S1). In Step S1, the design data is acquired by the design data acquirer 21 by, for instance, the user's operation on the controller 2 to input the design data.

Next, the measurement-path calculator 23 calculates a nominal value of the gear 40 based on the inputted design data (Step S2). Specifically, the nominal value of the tooth profile portions 41 of the gear is calculated based on the design data (e.g. a CAD data).

Subsequently, the measurement method for the workpiece W is acquired by the measurement-method acquirer 22 (Step S3). Specifically, the user can select one of (1) the autonomous scanning measurement performed when the entirety of the workpiece W is of the unknown-profile portions, (2) the nominal-value scanning measurement performed when the entirety of the workpiece W is of the known-profile portions, and (3) a composite measurement performed when the workpiece W includes the known-profile portions and the unknown-profile portions. The measurement-method acquirer 22 acquires the measurement method based on the user's input operation. It should be noted that Step S3, which is performed after Step S2 in the above, may alternatively be performed prior to Step S1 or Step S2.

Subsequently, the measurement-path calculator 23 outputs the measurement command to the measuring machine body 1 in accordance with the measurement method acquired in Step S3.

When the "autonomous scanning measurement" is acquired in Step S3, the measurement-path calculator 23 commands the measuring machine body 1 to measure the workpiece W by the autonomous scanning measurement. In this case, the measurement switcher 141 of the measuring machine controller 14 sets the autonomous scanning flag "on." Thus, the measuring machine body 1 performs the profile measurement only by the autonomous scanning measurement.

When the "nominal-value scanning measurement" is acquired in Step S3, the measurement-path calculator 23 calculates the movement path of the scanning probe 12 based on the nominal value and outputs the measurement command and the movement path to the measuring machine body 1.

It should be noted that the profile measurement only by the autonomous scanning measurement and the profile measurement only by the nominal-value scanning measurement, which are the same as those in the typical profile measuring method, will not be detailed herein.

When the "composite measurement" is acquired in Step S3, the measurement-path calculator 23 calculates the movement path of the scanning probe 12 (Step S4: path calculation step).

In Step S4 (first time), the movement path of the scanning probe 12 is calculated based on the nominal value calculated in Step S2. In other words, the movement path for the tooth profile portions 41 is calculated based solely on the nominal value of the tooth 41.

Next, the measurement-path calculator 23 calculates whether the movement path is definite (Step S5). Specifically, the measurement-path calculator 23 judges whether the generated movement path includes a portion of an unknown profile. In Step S4 (first time), only the movement path for the tooth profile portions 41 is calculated and the movement path for the tooth root portion 42 is not calculated. Accordingly, the judgement by the measurement-path calculator 23 in Step S5 is "No."

In response to the "No" judgment in Step S5, the measurement-path calculator 23 outputs an autonomous scanning measurement command to the measuring machine body 1. Then, the measurement switcher 141 of the measuring machine controller 14 sets the autonomous scanning flag "on," whereby the profile measurement for one of the tooth root portions 42 is performed by the autonomous scanning measurement unit 143 (Step S6: autonomous scanning measurement step). At this time, profiles of ends of the adjacent ones of the tooth profile portions 41 have been known from the nominal value calculated in Step S2. Accordingly, it is only necessary for the measurement-path calculator 23 to output the measurement command so that the autonomous scanning measurement is performed for the region between the ends of the tooth profile portions 41, thereby measuring a single one of the tooth root portions 42.

After Step S6, the process returns to Step S4.

Specifically, in Step S6, the measurement data of the autonomous scanning measurement is inputted to the controller 2. In response, the measurement-result calculator 24 calculates the profile data of the tooth root portion 42 based on the measurement data and outputs the calculated profile data to the measurement-path calculator 23. In Step S4 (the second and subsequent times), the measurement-path calculator 23 synthesizes the design data of the tooth profile portions 41 acquired in Step S2 and the profile data of the tooth root portion 42 acquired in Step S6 to calculate the movement path of the scanning probe 12, in which the movement path for the tooth profile portions 41 is continuous with the movement path for the tooth root portion 42.

At this time, the measurement-path calculator 23 fills the gaps between respective pairs of the tooth profile portions 41 determined based on the design data with the profile data acquired in Step S6 to calculate the movement path. Accordingly, it is not necessary in Step S6 to perform the autonomous scanning measurement on all of the tooth root portions 42 but the above-described measurement on only one of the tooth root portions 42 is sufficient.

It should be noted that, when the accuracy of the profile measurement on the tooth root portion 42 is decreased in the profile measurement in Step S6 due to occurrence of measurement errors or the like, the design data of the adjacent pair of the tooth profile portions 41 cannot be connected by the profile data. In this case, the movement path for the tooth profile portions 41 becomes discontinuous with the movement path for the tooth root portion 42. Accordingly, it is again judged "No" in Step S5, and another autonomous scanning measurement on the tooth root portion 42 is performed.

Further, though the gap between the design data of the adjacent ones of the tooth profile portions 41 is filled with the profile data corresponding to the single tooth root portion 42 to calculate the movement path in the first exemplary embodiment, the profile data is not necessarily fittable to all of the gaps between the tooth profile portions 41. For instance, the movement path based on the design data and the movement path based on the profile data may become discontinuous even when the design data of the measured tooth root portion 42 is fitted in some pairs of the tooth profile portions. In this case, in which the judgment in Step S5 is also "No," the autonomous scanning measurement may be performed for the tooth root portion 42 corresponding to the some pairs of the tooth profile portions. In other words, the measurement-path calculator 23 may be configured to calculate the movement path based on the design data for the tooth profile portions 41 and the profile data of the tooth root portion 42 acquired in the initial autonomous scanning measurement, and calculate the movement path using the profile data acquired by an additional autonomous scanning measurement only for the tooth root portion(s) 42 whose profile data is not fiftable.

Then, when the judgement in Step S5 is "Yes," the measurement-path calculator 23 outputs the measurement command for the nominal-value scanning measurement based on the movement path calculated for the measuring machine body 1 (Step S7).

In response, in the measuring machine body 1, the autonomous scanning flag is switched to "off" by the measurement switcher 141, so that the nominal-value scanning measurement unit 142 starts the nominal-value scanning measurement by moving the scanning probe 12 in accordance with the inputted movement path (Step S8).

Further, the nominal-value scanning measurement unit 142 monitors the measurement data acquired by the measurement and outputs the measurement error signal when the push amount of the tip ball 122 is out of the predetermined tolerable range. The measurement switcher 141 judges whether the measurement error signal is outputted by the nominal-value scanning measurement unit 142 (Step S9).

Then, when the measurement error signal is outputted and the judgement in Step S9 is "Yes," the measurement switcher 141 switches "on" the autonomous scanning measurement flag to perform the autonomous scanning measurement by the autonomous scanning measurement unit 143 on a part at which the measurement error signal is outputted (Step S10). In this case, the process returns to Step S4, where the movement path is again calculated based on the design data and the profile data acquired by the autonomous scanning measurement in the same manner as the autonomous scanning measurement in Step S6.

When the judgement in Step S9 is "No," the measuring machine controller 14 judges whether the measurement on the workpiece W is completed (Step S11). When the judgement in Step S11 is "No," the measurement is continued and the process returns to Step S9.

When the judgement in Step S11 is "Yes," the measurement-result calculator 24 measures the profile of the workpiece W based on the measurement data inputted by the measuring machine body 1. Then, after the measurement results are evaluated by the measurement-result evaluator 25 and outputted by the measurement-result output unit 26, the profile measurement on the workpiece W is completed.

It should be noted that, though the workpiece W in the above profile measuring method is exemplarily the gear 40, the profile of an object having a plurality of known-profile portions and a plurality of unknown-profile portions interposed between the plurality of known-profile portions (e.g. a rack having linearly arranged tooth profile portions and tooth root portions) can be measured in the same manner.

Effects and Advantages of First Exemplary Embodiment

The profile measuring machine 100 according to the first exemplary embodiment is configured to measure the profile of the workpiece W having a plurality of known-profile portions (tooth profile portions 41) and a plurality of unknown-profile portions (tooth root portions 42), the known-profile portions (tooth profile portions 41) being cyclically arranged via the respective unknown-profile portions (tooth root portions 42). The measuring machine body 1 of the profile measuring machine 100 includes the scanning probe 12 having the tip ball 122 contactable with the surface of the workpiece W, the drive mechanism 13 for moving the scanning probe 12, and the measuring machine controller 14 for controlling the drive mechanism 13 to measure the workpiece W. Further, the measuring machine controller 14 includes the autonomous scanning measurement unit 143 for measuring the profile of the workpiece W by the autonomous scanning measurement and the nominal-value scanning measurement unit 142 for moving the scanning probe 12 along the movement path based on the design data to measure the profile of the workpiece W by the nominal-value scanning measurement. In addition, the controller 2 of the profile measuring machine 100 includes the measurement-path calculator 23 for calculating the movement path of the scanning probe 12 in performing the nominal-value scanning measurement on the workpiece W. The measurement-path calculator 23 calculates the movement path of the scanning probe 12 for the workpiece W based on the profile data based on the measurement results of the unknown-profile portions (tooth root portions 42) measured by the autonomous scanning measurement unit 143 and the design data of the known-profile portions (tooth profile portions 41).

Accordingly, in the first exemplary embodiment, the movement path can be determined even when the unknown-profile portions (tooth root portions 42) are present on the workpiece W, thus allowing the nominal-value scanning measurement unit 142 to perform the nominal-value scanning measurement on the entirety of the workpiece W.

Further, in the first exemplary embodiment, it is not necessary to perform the probing measurement using a uniaxial probe on the unknown-profile portions (tooth root portions 42) as in typical measuring machines, eliminating the need for exchanging the probes. Furthermore, since it is sufficient that the autonomous scanning measurement should be performed only on a part of the tooth root portions 42, the time required for the profile measurement can be significantly reduced as compared with an instance where the entirety of the workpiece W is measured by the autonomous scanning measurement.

In the first exemplary embodiment, the autonomous scanning measurement unit 143 performs the autonomous scanning measurement on a single one of the unknown-profile portions (tooth root portions 42) and the measurement-path calculator 23 calculates the movement path based on the profile data based on the measurement results of the single one of the unknown-profile portions (tooth root portions 42), and the design data.

Accordingly, it is only necessary to perform the autonomous scanning measurement by the autonomous scanning measurement unit 143 on only one of the plurality of unknown-profile portions (tooth root portions 42), thereby further reducing the time required for the profile measurement.

Further, in the first exemplary embodiment, the nominal-value scanning measurement unit 142 outputs the measurement error signal when the push amount of the scanning probe 12 is out of a predetermined tolerable range when the scanning probe 12 is moved along the movement path. Then, the autonomous scanning measurement unit 143 again performs the autonomous scanning measurement when the measurement error signal is outputted.

Accordingly, when the measurement error signal is outputted, the autonomous scanning measurement is again performed on the unknown-profile portion (tooth root portion 42) at which the measurement error signal is outputted, and the movement path is calculated again by the measurement-path calculator 23 based on the results of the autonomous scanning measurement. Accordingly, the profile measurement of the workpiece W is not interrupted by the measurement error signal, and a rapid measurement can be performed by the autonomous scanning measurement and the nominal-value scanning measurement while keeping the measurement accuracy.

Second Exemplary Embodiment

Next, a second exemplary embodiment will be described below.

In the first exemplary embodiment, the tooth root portion 42 is measured by the autonomous scanning measurement to calculate the profile data of the tooth root portion 42, and the measurement-path calculator 23 calculates the movement path of the scanning probe 12 using the profile data of the tooth root portion 42 and the design data of the tooth profile portions 41.

In contrast, the second exemplary embodiment is different from the first exemplary embodiment in that the measurement-path calculator 23 only uses the profile data based on the measurement results of the autonomous scanning measurement to determine the movement path of the workpiece W without using the design data of the tooth profile portions 41.

It should be noted that, in the description below, the features having been already described will be denoted by the same reference signs to omit or simplify the explanation thereof.

A profile measuring machine 100, which has an arrangement similar to that in the first exemplary embodiment shown in FIGS. 1 and 2, includes the measuring machine body 1 and the controller 2.

The measurement-path calculator 23 in the first exemplary embodiment requires the design data for the tooth profile portions 41 in performing the composite measurement. In contrast, the measurement-path calculator 23 of the second exemplary embodiment does not require the design data for the workpiece W. Specifically, the autonomous scanning measurement unit 143 of the second exemplary embodiment is configured to perform the autonomous scanning measurement on the tooth profile portion 41 and the tooth root portion 42 for one of the teeth of the gear 40. Thus, the measurement-result calculator 24 is configured to generate the profile data for the one of the teeth based on the measurement results from the tooth profile portion 41 to the tooth root portion 42 for one of the teeth. Then, the measurement-path calculator 23 is configured to calculate the profile of the gear 40 by combining the profile data for the one of the teeth to calculate the movement path of the scanning probe 12.

Figure 5:
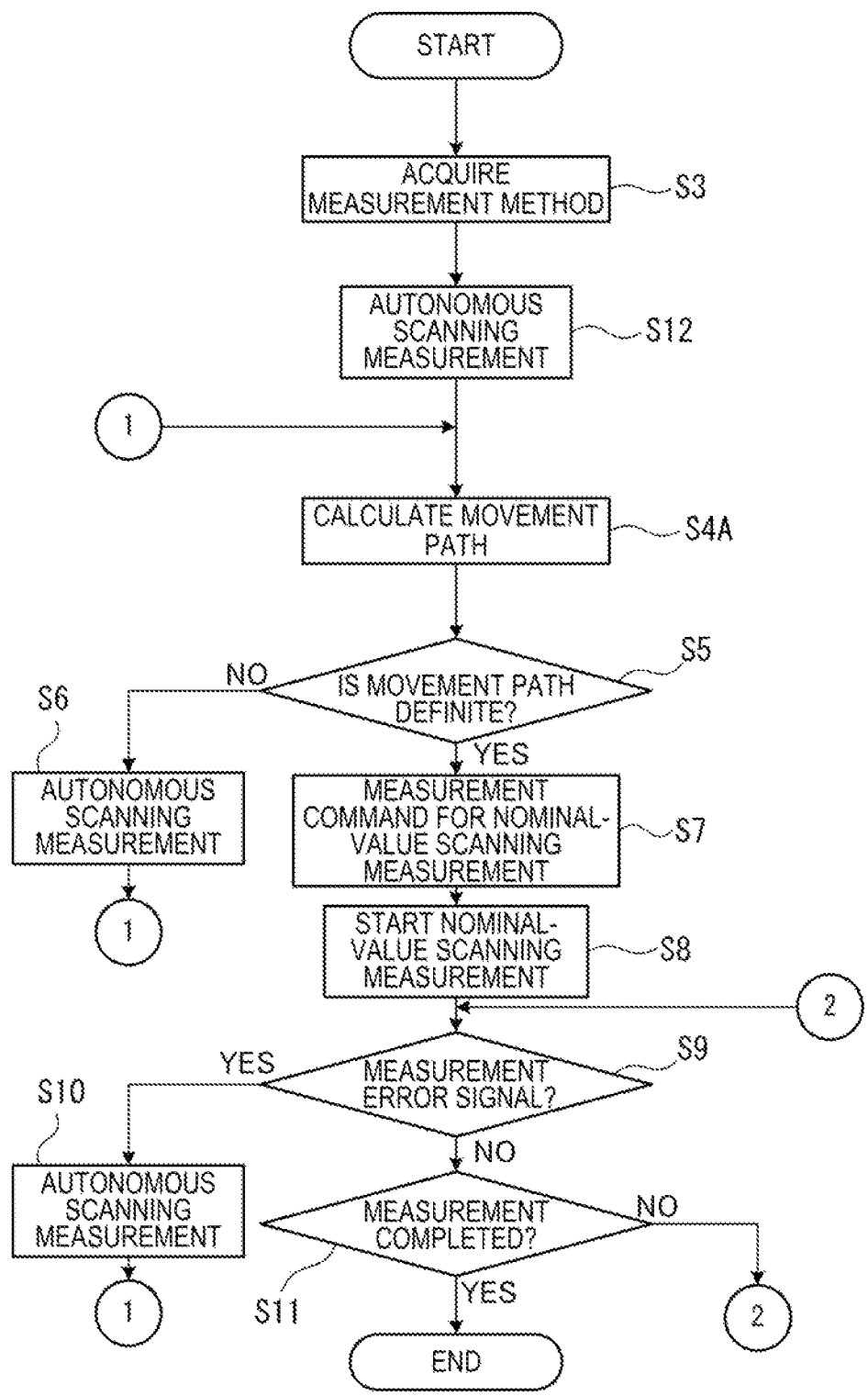
FIG. 5 is a flow chart showing a profile measuring method according to a second exemplary embodiment.

FIG. 5 is a flow chart showing the profile measuring method using the profile measuring machine 100 according to the second exemplary embodiment.

The profile measuring machine 100 according to the second exemplary embodiment, which performs Step S3 as in the first exemplary embodiment, allows a user to select the measurement method performed on the workpiece W from (1) the autonomous scanning measurement, (2) the nominal-value scanning measurement, and (3) the composite measurement. It should be noted that the instances where the autonomous scanning measurement or the nominal-value scanning measurement is selected as the measurement method will not be described herein.

When the "composite measurement" is selected as the measurement method in Step S3, the measurement-path calculator 23 initially outputs a measurement command for the autonomous scanning measurement to the measuring machine body 1.

In response, the measurement switcher 141 of the measuring machine controller 14 sets the autonomous scanning flag "on," whereby the profile measurement for the tooth profile portion 41 and the tooth root portion 42 for one of the teeth is performed by the autonomous scanning measurement unit 143 (Step S12: autonomous scanning measurement step).

When the measurement data of the autonomous scanning measurement is inputted to the controller 2 in Step S12, the measurement-result calculator 24 calculates the profile data of the tooth profile portion and the tooth root portion 42 based on the measurement data and outputs the calculated profile data to the measurement-path calculator 23.

Then, the measurement-path calculator 23 synthesizes a plurality of profile data for the tooth profile portion 41 and the tooth root portion 42 for one of the teeth to calculate the movement path of the scanning probe 12 (Step S4A: path calculation step).

Subsequent steps are the same as those in the first exemplary embodiment.

Effects and Advantages of Second Exemplary Embodiment

The profile measuring machine 100 according to the second exemplary embodiment includes, as in the first exemplary embodiment, the measuring machine body 1 and the controller 2, the measuring machine body 1 including the scanning probe 12, the drive mechanism 13, and the measuring machine controller 14 serving as the nominal-value scanning measurement unit 142 and the autonomous scanning measurement unit 143. Further, the controller 2 includes the measurement-path calculator 23. In the second exemplary embodiment, the measurement-path calculator 23 calculates the movement path of the scanning probe 12 for the workpiece W using the profile data based on the measurement results of the unknown-profile portion (tooth root portion 42) and the known-profile portion (tooth profile portion 41) measured by the autonomous scanning measurement unit 143.

Accordingly, in the second exemplary embodiment, even when the design data of the workpiece W is not available, the movement path of the scanning probe 12 for performing the nominal-value scanning measurement can be calculated by performing the autonomous scanning measurement only on a part of the known-profile portions (tooth profile portions 41) and the unknown-profile portions (tooth root portions 42) of the workpiece W. Thus, the time required for the measurement can be reduced as compared with the instance in which the entirety of the workpiece W is measured by the autonomous scanning measurement.

In the second exemplary embodiment, the autonomous scanning measurement unit 143 performs the autonomous scanning measurement on the pair of the known-profile portion (tooth profile portion 41) and the unknown-profile portion (tooth root portion 42) and the measurement-path calculator 23 calculates the movement path using the profile data based on the measurement results of the pair of the known-profile portion (tooth profile portion 41) and the unknown-profile portion (tooth root portion 42).

Accordingly, the measurement time can be reduced as compared to an instance where a plurality of pairs of the known-profile portions (tooth profile portions 41) and the unknown-profile portions (tooth root portions 42) are measured by the autonomous scanning measurement unit 143.

Modifications

It should be noted that the scope of the invention is not limited by the above-described exemplary embodiment(s), but encompasses modifications, improvements and the like compatible with an object of the invention.

In the first exemplary embodiment, when the measurement error signal is outputted after the nominal-value scanning measurement is started in Step S8, the measurement method is switched to the autonomous scanning measurement as in Step S10, where the measurement-path calculator 23 re-calculates the movement path, which has been acquired in Step S4, based on the measurement results by the autonomous scanning measurement in Step S10.

Alternatively, when the measurement error signal is outputted by the nominal-value scanning measurement unit 142 in some embodiments, the subsequent measurement step is switched to the autonomous scanning measurement. In this case, the measurement data acquired by the nominal-value scanning measurement is used until the measurement error signal is outputted and, after the measurement error signal is outputted, the measurement data acquired by the autonomous scanning measurement is used to measure the profile of the workpiece W.

The same applies to the second exemplary embodiment, where, after the measurement error signal is outputted, the profile measurement by the autonomous scanning measurement may be continued without returning to Step S4A.

In the first exemplary embodiment, the autonomous scanning measurement is performed on the single tooth root portion 42 in Step S6, and, in Step S4, the measurement-path calculator 23 calculates the movement path using the design data of the plurality of tooth profile portions 41 and the profile data for the single tooth root portion 42 based on the measurement results by the autonomous scanning measurement. In contrast, the autonomous scanning measurement in some embodiments is performed on some of the entire tooth root portions 42 of the gear 40 in Step S6. The same applies to Step S12 in the second exemplary embodiment, where the autonomous scanning measurement is performed on some of the entire pairs of the tooth profile portions 41 and tooth root portions 42 of the gear 41 in some embodiments.

In the above-described exemplary embodiments, the measuring machine body 1 includes the drive mechanism 13 for holding the scanning probe 12 so that the scanning probe 12 is movable in the X, Y, and Z directions. However, the drive mechanism 13 is not necessarily configured as in the above exemplary embodiments. For instance, the scanning probe 12 is held by a multi-joint arm or the like, whose angle is automatically controlled, to move the scanning probe 12 in some embodiments. Though the scanning probe 12, which is movable in the X-direction, Y-direction, and Z-direction in the above exemplary embodiments, is movable only, for instance, biaxially (e.g. in the X-direction and Z-direction) in some embodiments.

In the first exemplary embodiment, the tooth root portion 42 is exemplarily the unknown-profile portion and the tooth profile portion 41 is exemplarily the known-profile portion. However, such an arrangement is not exhaustive. For instance, in an instance where the tooth profile portion 41 is the unknown-profile portion and the tooth root portion 42 is the known-profile portion, the movement path of the scanning probe 12 is calculated in some embodiments using the measurement results of the autonomous scanning measurement performed on the tooth profile portion 41 and the profile nominal value of the tooth root portion 42 based on the design data. The same applies to an instance where only a part of the tooth profile portion 41 is the unknown-profile portion and/or only a part of the tooth root portion 42 is the unknown-profile portion. In this case, the movement path of the scanning probe 12 can also be calculated using the measurement results of the autonomous scanning measurement performed on the unknown profile portion and the profile nominal value of the known profile portion.

What is claimed is:

1. A profile measuring machine configured to measure a profile of a workpiece comprising a plurality of known-profile portions whose profiles are known, the known-profile portions being cyclically arranged via respective unknown-profile portions whose profiles are unknown, the profile measuring machine comprising:
   a scanning probe comprising a contact piece configured to be in contact with the workpiece;
   a drive mechanism configured to move the scanning probe;
   an autonomous scanning measurement unit configured to control the drive mechanism to perform an autonomous scanning measurement, in which the scanning probe is moved along the workpiece to measure the profile of the workpiece while the scanning probe is pressed against the workpiece by a predetermined push amount;
   a measurement-path calculator configured to calculate a movement path of the scanning probe for performing a scanning measurement on the workpiece; and
   a nominal-value scanning measurement unit configured to control the drive mechanism to perform a nominal-value scanning measurement, in which the scanning probe is moved along the movement path to measure the profile of the workpiece, wherein
   the measurement-path calculator is configured to calculate the movement path for the workpiece based on measurement results of at least one of the unknown-profile portions measured by the autonomous scanning measurement unit and design data of the known-profile portions.

2. The profile measuring machine according to claim 1, wherein
   the autonomous scanning measurement unit is configured to perform the autonomous scanning measurement on one of the unknown-profile portions, and
   the measurement-path calculator is configured to calculate the movement path based on the measurement results of the one of the unknown-profile portions and the design data of the known-profile portions.

3. The profile measuring machine according to claim 1, wherein
   the nominal-value scanning measurement unit is configured to output a measurement error signal when the push amount of the scanning probe is out of a predetermined tolerable range in the measurement along the movement path, and
   the autonomous scanning measurement unit is configured to perform the autonomous scanning measurement again when the measurement error signal is outputted.

4. A profile measuring machine configured to measure a profile of a workpiece comprising a plurality of known-profile portions whose profiles are known, the known-profile portions being cyclically arranged via respective unknown-profile portions whose profiles are unknown, the profile measuring machine comprising:
   a scanning probe comprising a contact piece configured to be in contact with the workpiece;
   a drive mechanism configured to move the scanning probe;
   an autonomous scanning measurement unit configured to control the drive mechanism to perform an autonomous scanning measurement, in which the scanning probe is moved along the workpiece to measure the profile of the workpiece while the scanning probe is pressed against the workpiece by a predetermined push amount;
   a measurement-path calculator configured to calculate a movement path of the scanning probe when a profiling measurement is performed on the workpiece; and
   a nominal-value scanning measurement unit configured to control the drive mechanism to perform a nominal-value scanning measurement, in which the scanning probe is moved along the movement path to measure the profile of the workpiece, wherein
   the measurement-path calculator is configured to calculate the movement path for the workpiece based on measurement results of a combination of at least one of the known-profile portions and at least one of the unknown-profile portions measured by the autonomous scanning measurement unit.

5. The profile measuring machine according to claim 4, wherein
   the autonomous scanning measurement unit is configured to perform the autonomous scanning measurement on a pair of one of the unknown-profile portions and one of the known-profile portions, and
   the measurement-path calculator is configured to calculate the movement path based on the measurement results of the pair of one of the unknown-profile portions and one of the known-profile portions.

6. The profile measuring machine according to claim 4, wherein
   the nominal-value scanning measurement unit is configured to output a measurement error signal when the push amount of the scanning probe is out of a predetermined tolerable range in the measurement along the movement path, and the autonomous scanning measurement unit is configured to perform the autonomous scanning measurement again when the measurement error signal is outputted.

7. A profile measuring method configured to measure a profile of a workpiece using a profile measuring machine comprising: a scanning probe comprising a contact piece configured to be in contact with the workpiece; and a drive mechanism configured to move the scanning probe, the workpiece comprising a plurality of known-profile portions whose profiles are known, the known-profile portions being cyclically arranged via respective unknown-profile portions whose profiles are unknown, the profile measuring method comprising:

an autonomous scanning measurement step of controlling the drive mechanism to perform an autonomous scanning measurement, in which the profile of the workpiece is measured by moving the scanning probe along the workpiece while the scanning probe is pressed against the workpiece by a predetermined push amount;

a movement-path calculation step, in which a movement path of the scanning probe when a scanning measurement is performed on the workpiece is calculated; and a nominal-value scanning measurement step of controlling the drive mechanism to perform a nominal-value scanning measurement, in which the scanning probe is moved along the movement path to measure the profile of the workpiece, wherein in the measurement-path calculating step, the movement path for the workpiece is calculated based on measurement results of at least one of the unknown-profile portions measured in the autonomous scanning measurement step and design data of the known-profile portions.

8. A profile measuring method configured to measure a profile of a workpiece using a profile measuring machine comprising: a scanning probe comprising a contact piece configured to be in contact with the workpiece; and a drive mechanism configured to move the scanning probe, the workpiece comprising a plurality of known-profile portions whose profiles are known, the known-profile portions being cyclically arranged via respective unknown-profile portions whose profiles are unknown, the profile measuring method comprising:

an autonomous scanning measurement step of controlling the drive mechanism to perform an autonomous scanning measurement, in which the profile of the workpiece is measured by moving the scanning probe along the workpiece while the scanning probe is pressed against the workpiece by a predetermined push amount;

a movement-path calculation step, in which a movement path of the scanning probe when a scanning measurement is performed on the workpiece is calculated; and a nominal-value scanning measurement step of controlling the drive mechanism to perform a nominal-value scanning measurement, in which the scanning probe is moved along the movement path to measure the profile of the workpiece, wherein in the measurement-path calculation step, the movement path for the workpiece is calculated based on measurement results of a combination of one of the known-profile portions and one of the unknown-profile portions measured in the autonomous scanning measurement step.

* * * * *